United States Patent
Wang et al.

(10) Patent No.: US 12,096,908 B2
(45) Date of Patent: *Sep. 24, 2024

(54) ROBOT CLEANER AND ROBOT CLEANER CONTROL METHOD

(71) Applicant: PixArt Imaging Inc., Hsin-Chu (TW)

(72) Inventors: Guo-Zhen Wang, Hsin-Chu (TW); Ting-Yang Chang, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/197,739

(22) Filed: May 16, 2023

(65) Prior Publication Data

US 2023/0301479 A1  Sep. 28, 2023

Related U.S. Application Data

(63) Continuation of application No. 16/924,138, filed on Jul. 8, 2020, now Pat. No. 11,690,490.

(51) Int. Cl.
| | |
|---|---|
| *A47L 9/28* | (2006.01) |
| *A47L 9/00* | (2006.01) |
| *A47L 11/40* | (2006.01) |
| *G01B 11/02* | (2006.01) |
| *G05D 1/00* | (2006.01) |

(52) U.S. Cl.
CPC ............ *A47L 9/2826* (2013.01); *A47L 9/009* (2013.01); *A47L 11/4011* (2013.01); *A47L 11/4061* (2013.01); *G01B 11/02* (2013.01); *G05D 1/0238* (2013.01); *A47L 2201/04* (2013.01); *A47L 2201/06* (2013.01)

(58) Field of Classification Search
None
See application file for complete search history.

(56) References Cited

U.S. PATENT DOCUMENTS

| | | | | |
|---|---|---|---|---|
| 9,511,494 | B2 * | 12/2016 | Noh | ............ G05D 1/0248 |
| 10,349,798 | B2 * | 7/2019 | Jun | ............... A47L 9/2873 |
| 11,690,490 | B2 * | 7/2023 | Wang | ............. A47L 9/2826 15/3 |
| 2013/0338831 | A1 | 12/2013 | Noh | |
| 2020/0114517 | A1 * | 4/2020 | Wang | ............... G01S 17/88 |
| 2021/0170585 | A1 * | 6/2021 | Kim | .............. B25J 11/0015 |

FOREIGN PATENT DOCUMENTS

| | | |
|---|---|---|
| CN | 107850422 A | 3/2018 |
| CN | 108209746 A | 6/2018 |
| CN | 207979622 U | 10/2018 |
| CN | 110353583 A | 10/2019 |
| CN | 111035321 A | 4/2020 |
| CN | 111093019 A | 5/2020 |
| CN | 210931169 U | 7/2020 |

* cited by examiner

*Primary Examiner* — Peter D Nolan
*Assistant Examiner* — Jacob Kent Besteman-Street
(74) *Attorney, Agent, or Firm* — Winston Hsu (57) ABSTRACT

A robot cleaner comprises a first light source, an optical sensor, a processing circuit and a second light source. The first light source emits first light. The optical sensor senses first optical data generated according to the first light. The processing circuit computes a height or an overhang height of an obstacle based on the first optical data. The second light source emits second light. The optical sensor senses second optical data generated according to the second light. The processing circuit determines whether the obstacle exists in the predetermined region or not based on the second optical data.

10 Claims, 7 Drawing Sheets

FIG. 9

# ROBOT CLEANER AND ROBOT CLEANER CONTROL METHOD

CROSS REFERENCE TO RELATED APPLICATIONS

This application is a continuation application of U.S. Application Ser. No. 16/924,138, filed on Jul. 8, 2020. The content of the application is incorporated herein by reference.

BACKGROUND OF THE INVENTION

1. Field of the Invention

The present invention relates to a robot cleaner and a robot cleaner control method, and particularly relates to a robot cleaner and a robot cleaner control method which can operate according to a height or an overhang height of an object.

2. Description of the Prior Art

An auto clean machine, such as a robot cleaner, becomes more and more popular in recent years. The auto clean machine may have an obstacle avoidance function. However, such obstacle avoidance function is always designed for a large obstacle such as a sofa or a wall. Some auto clean machines may have a lidar to detect obstacles. However, such lidar is always provided on or in a higher position of the auto clean machine, thus could not be used to detect an obstacle which is on the ground and has a small size.

Therefore, a conventional auto clean machine could not determine whether an obstacle in front of it can be climbed over or not, or can be entered or not. The user may feel inconvenient and the clean operation of the auto clean machine may be non-efficient due to such issue.

SUMMARY OF THE INVENTION

Therefore, one objective of the present invention is to provide a robot cleaner which can compute a height or an overhang height of an obstacle and can operate based on the height.

Another objective of the present invention is to provide a robot cleaner control method which can compute a height or an overhang height of an obstacle and can control the auto clean machine to operate based on the height.

One embodiment of the present invention discloses a robot cleaner, comprising: a first light source, configured to emit first light; an optical sensor, configured to sense first optical data generated according to the first light; a processing circuit, configured to compute a height or an overhang height of an obstacle based on the first optical data; wherein the first light source is turned on when the processing circuit determines the obstacle exists in a predetermined region; wherein the first light source is turned off when the processing circuit does not determine the obstacle exists in the predetermined region. The robot cleaner further comprises a second light source, configured to emit second light; wherein the optical sensor senses second optical data generated according to the second light; wherein the processing circuit determines whether the obstacle exists in the predetermined region or not based on the second optical data; wherein the processing circuit computes the height of the obstacle when the obstacle existing in the predetermined region of the robot cleaner is determined; wherein the processing circuit does not compute the height and the overhang height when the obstacle does not exist in the predetermined region is determined.

Another embodiment of the present invention discloses a robot cleaner control method, applied to a robot cleaner comprising a first light source and a second light source, comprising: emitting first light by the first light source; sensing first optical data generated according to the first light; computing a height or an overhang height of an obstacle based on the first optical data, wherein the first light source is turned on when the processing circuit determines the obstacle exists in a predetermined region, wherein the first light source is turned off when the processing circuit does not determine the obstacle exists in the predetermined region. The robot cleaner control method further comprises: emitting second light by the second light source; sensing second optical data generated according to the second light; determining whether the obstacle exists in the predetermined region or not based on the second optical data; computing the height of the obstacle when the obstacle existing in the predetermined region of the robot cleaner is determined; and not computing the height and the overhang height when the obstacle does not exist in the predetermined region is determined.

In view of above-mentioned embodiments, the auto clean machine can compute a height or an overhang height of an obstacle and operates accordingly, thus the convenience and the accuracy of cleaning performed by the auto clean machine can be increased.

These and other objectives of the present invention will no doubt become obvious to those of ordinary skill in the art after reading the following detailed description of the preferred embodiment that is illustrated in the various figures and drawings.

DETAILED DESCRIPTION

Several embodiments are provided in following descriptions to explain the concept of the present invention. Each component in following descriptions can be implemented by hardware (e.g. a device or a circuit) or hardware with software (e.g. a program installed to a processor). Besides, the method in following descriptions can be executed by programs stored in a non-transitory computer readable recording medium such as a hard disk, an optical disc or a memory. Besides, the term "first", "second", "third" in following descriptions are only for the purpose of distinguishing different one elements (e.g. step, device, parameter), and do not mean the sequence of the elements. For example, a first device and a second device only mean these devices can have the same structure but are different devices. Further, the components in each embodiment can be separated to more components or be integrated to fewer components.

Figure 1:
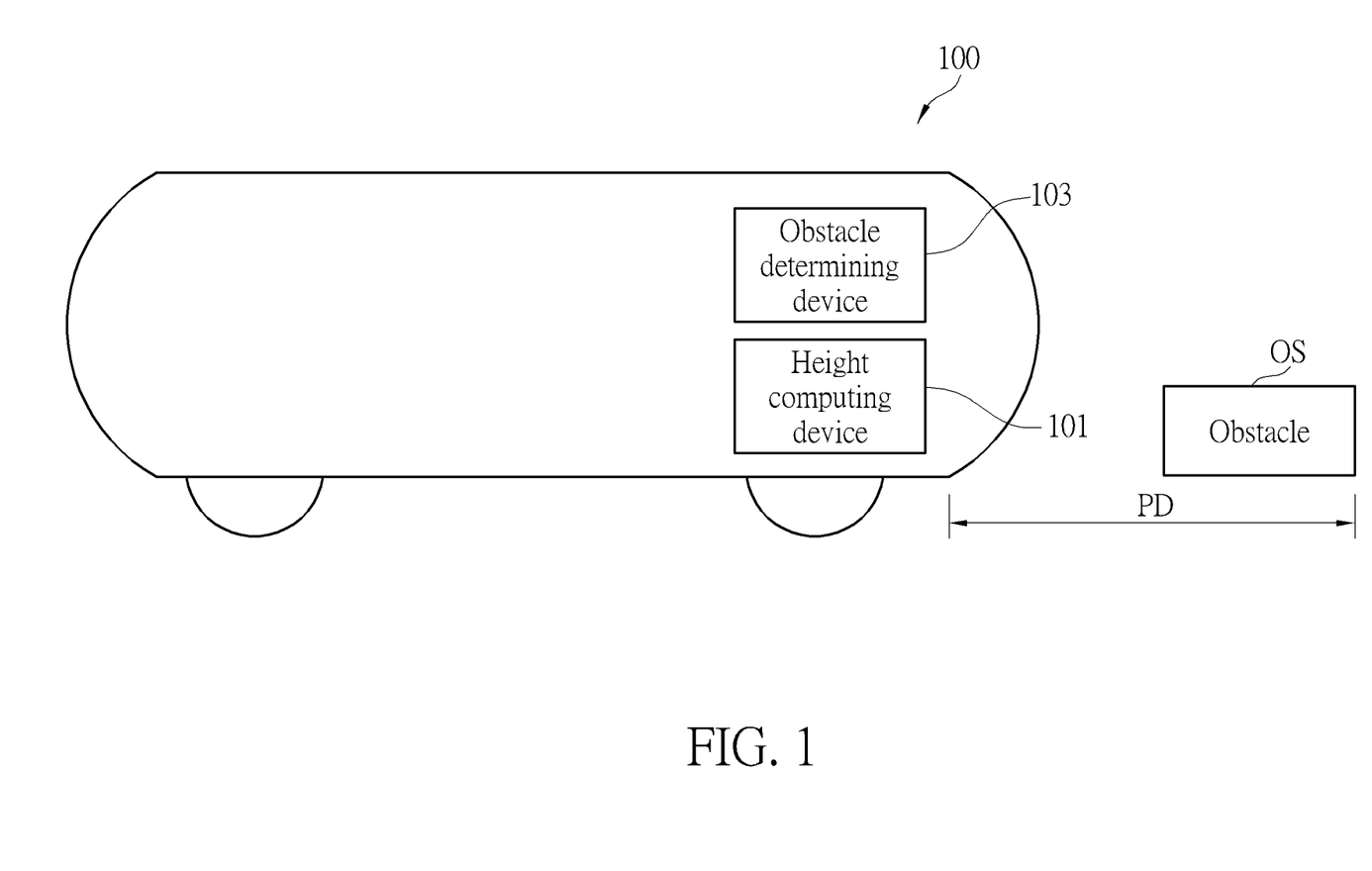
FIG. 1 is a block diagram illustrating an auto clean machine according to one embodiment of the present invention.

FIG. 1 is a block diagram illustrating an auto clean machine 100 according to one embodiment of the present invention. As illustrated in FIG. 1, the auto clean machine 100 comprises a height computing device 101 and an obstacle determining device 103. The height computing device 101 is turned on to compute a height of an obstacle OS when the obstacle determining device 103 determines the obstacle OS exists in a predetermined region PD of the auto clean machine 100. Also, the height computing device 100 is turned off (i.e. does not compute a height of the obstacle OS) when the obstacle determining device 103 does not determine the obstacle OS exists in the predetermined region PD. The auto clean machine 100 can be a robot cleaner, or any other kind of cleaner which can automatically clean a surface which the cleaner is provided on.

In one embodiment, the predetermined region PD is in front of the auto clean machine 100, as shown in FIG. 1. However, the predetermined region PD can be provided in another direction of the auto clean machine 100 corresponding to different types of auto clean machines or different requirements. Further, in one embodiment, when the auto clean machine 100 is moving and/or cleaning a surface (e.g. a ground) which the auto clean machine 100 locates on, the height computing device 101 is turned off and the obstacle determining device 103 is turned on. When the obstacle determining device 103 determines the obstacle OS exists in the predetermined region PD, the height computing device 101 is turned on. In such case, the obstacle determining device 103 can be turned off to save power, but also can keep turning on. However, the height computing device 101 may still be turned on but does not compute the height when the obstacle determining device 103 is turned on.

Figure 2:
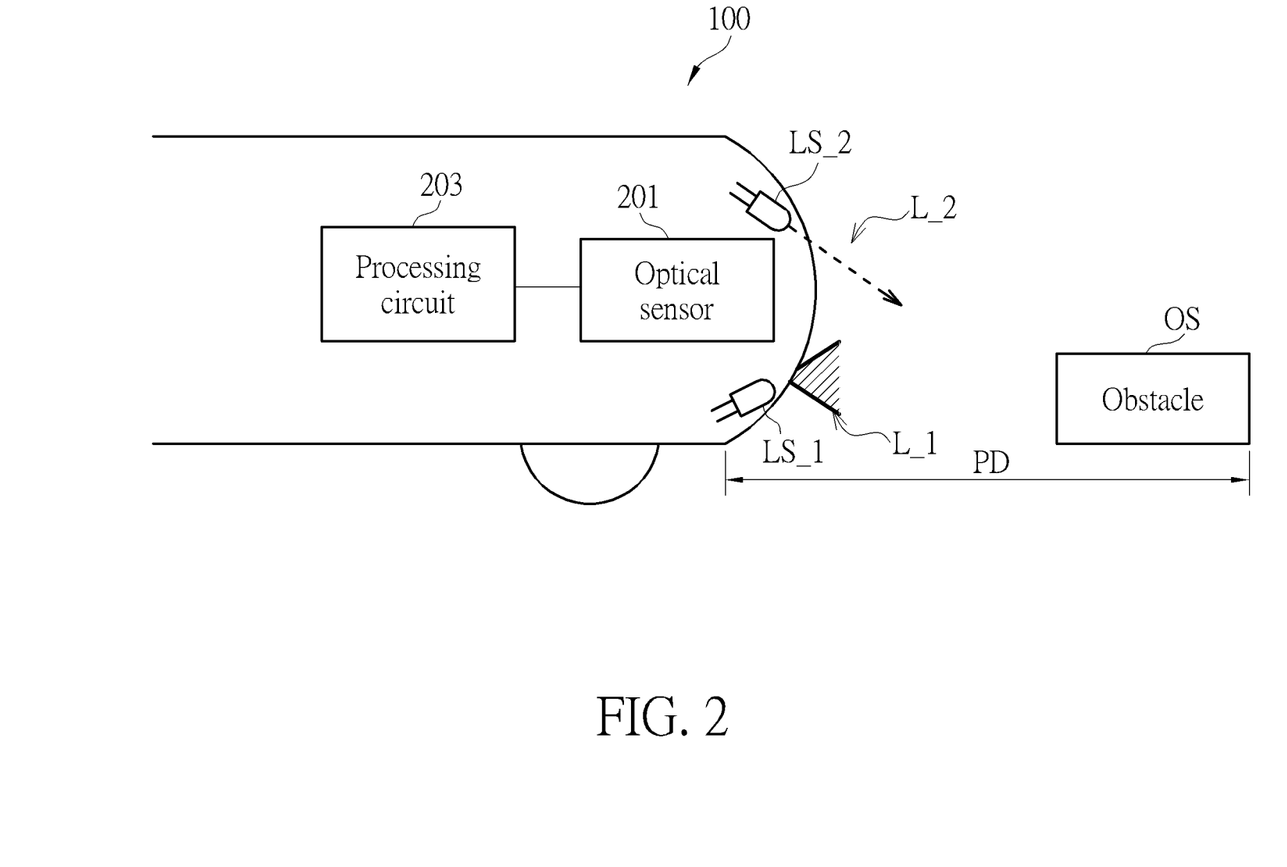
FIG. 2 is a schematic diagram illustrating a more detail structure of the embodiment illustrated in FIG. 1 according to one embodiment of the present invention.

The above-mentioned height computing device 101 and the obstacle determining device 103 can be implemented by various circuits and/or devices. FIG. 2 is a schematic diagram illustrating a more detail structure of the embodiment illustrated in FIG. 1 according to one embodiment of the present invention. As illustrated in FIG. 2, the auto clean machine 100 comprises a first light source LS_1, a second light source LS_2, an optical sensor 201 and a processing circuit 203. The first light source LS_1, the optical sensor 201 and the processing circuit 203 form the height computing device 101.

The first light source LS_1 is configured to emit first light L_1. The optical sensor 201 is configured to sense first optical data generated according to the first light L_1. The first optical data and following second optical data can be images or any other optical data with optical features (e.g. brightness). The processing circuit 203 is configured to compute a height of the obstacle OS based on the first optical data. The first light source LS_1 is turned on (i.e. the height computing device 101 is turned on) when the obstacle determining device 103 determines the obstacle OS exists in the predetermined region PD. Also, the first light source LS_1 may be turned off (i.e. the height computing device 101 is turned off) when the obstacle determining device 103 does not determine the obstacle OS exists in the predetermined region PD. In one embodiment, the processing circuit 203 is a processor of the auto clean machine 100, thus can be applied to control other operations of the auto clean machine 100. However, the processing circuit 203 can be a circuit independent from the processor of the auto clean machine 100.

Also, the second light source LS_2, the optical sensor 201 and the processing circuit 203 form the obstacle determining device 103. The second light source LS_2 is configured to emit second light L_2. The optical sensor 201 senses second optical data generated according to the second light L_2. The processing circuit 203 determines whether the obstacle OS exists in the predetermined region PD or not based on the second optical data. In the embodiment of FIG. 2, the first light source LS_1 emits the first light L_1 to a forward direction X of the auto clean machine, and the second light source LS_2 also emits the second light L_2 following the forward direction X.

Figure 3:
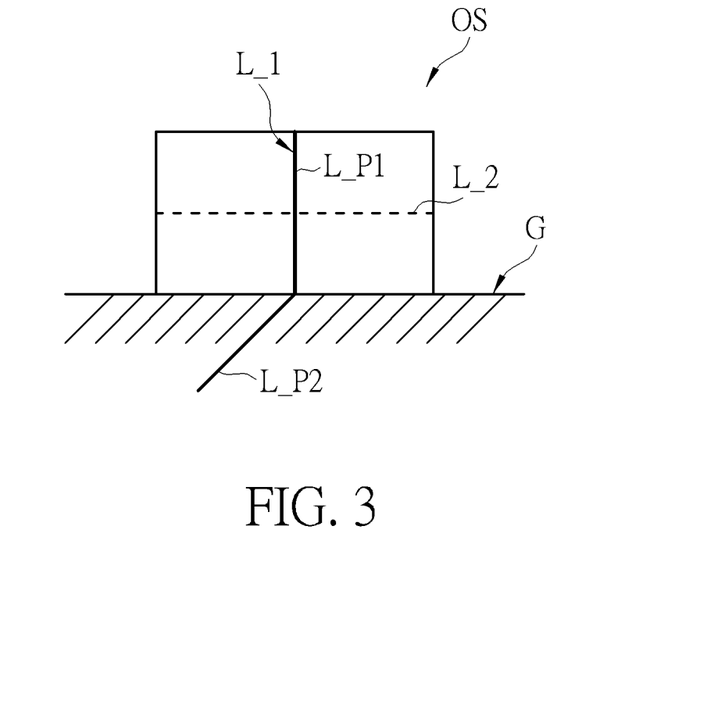
FIG. 3 and FIG. 4 are schematic diagrams illustrating operations of the embodiment illustrated in FIG. 1 according to embodiments of the present invention.

In one embodiment, the first light L_1 is line light perpendicular with a ground G which the auto clean machine moves on, and the second light L_2 is line light parallel with the ground G, as shown in FIG. 3. The obstacle OS also locates on the ground G. FIG. 3 is a schematic diagram illustrating a situation that the first light L_1 and the second light L_2 are emitted to the obstacle OS, which is viewed in the forward direction X in FIG. 2.

In such case, the processing circuit 203 can determine whether the obstacle OS exists in the predetermined region PD according to the second light L_2 in the second optical data. For example, if no obstacle OS exists, the second light L_2 may form a complete line light on the ground G. If the obstacle OS exists, the second light L_2 may be separated into different parts. One part is on the obstacle OS, and other parts are on the ground G or on other objects located on the ground G.

Also, various methods can be applied to compute the height of the obstacle OS via the first light source LS_1, the optical sensor 201 and the processing circuit 203. For example, in the embodiment of FIG. 3, the first light L_1 forms a first light part L_P1 on the obstacle OS, and forms a second light part L_P2 on the ground G. The processing circuit 203 can compute a height of the obstacle OS based on lengths of the first light part L_P1, the second light part L_P2 and a bending angle between the first light part L_P1 and the second light part L_P2. For another example, a length of the first light source LS_1 can be pre-recorded, and the processing circuit 203 can compute a height of the obstacle OS based on a ratio between the recorded length and a summing of lengths of the first light part L_P1, the second light part L_P2, and the length of the first light part L_P1. Such methods can also be used to compute the overhang height, which will be described for more detail later. It will be appreciated the method of computing the height is not limited to these methods.

Figure 4:
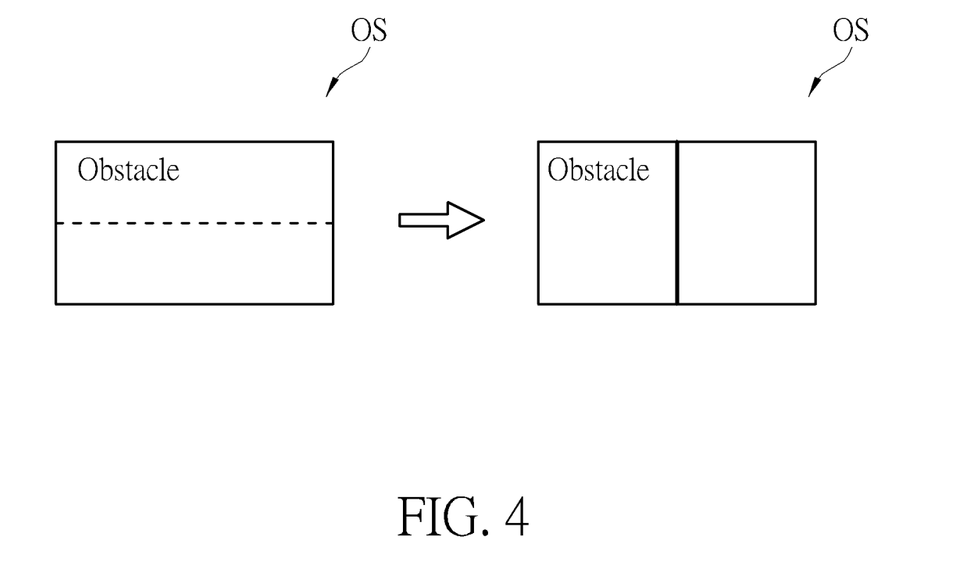

As above-mentioned, when the auto clean machine 100 is moving and/or cleaning a surface which the auto clean machine 100 locates on, the height computing device 101 may be turned off and the obstacle determining device 103 is turned on. When the obstacle determining device 103 determines the obstacle OS exists in the predetermined region PD, the height computing device 101 is turned on. In such case, the obstacle determining device 103 can be turned off to save power, but also can keep turning on. Therefore, as shown in FIG. 4, when the auto clean machine 100 is moving and/or cleaning a surface which the auto clean machine 100 locates on, the first light source LS_1 may be turned off and the second light source LS_2 is turned on. After the obstacle determining device 103 determines the obstacle OS exists in the predetermined region PD, the first light source LS_1 is turned on. In such case, the second light source LS_2 can be turned off to save power, but also can keep turning on.

Figure 5:
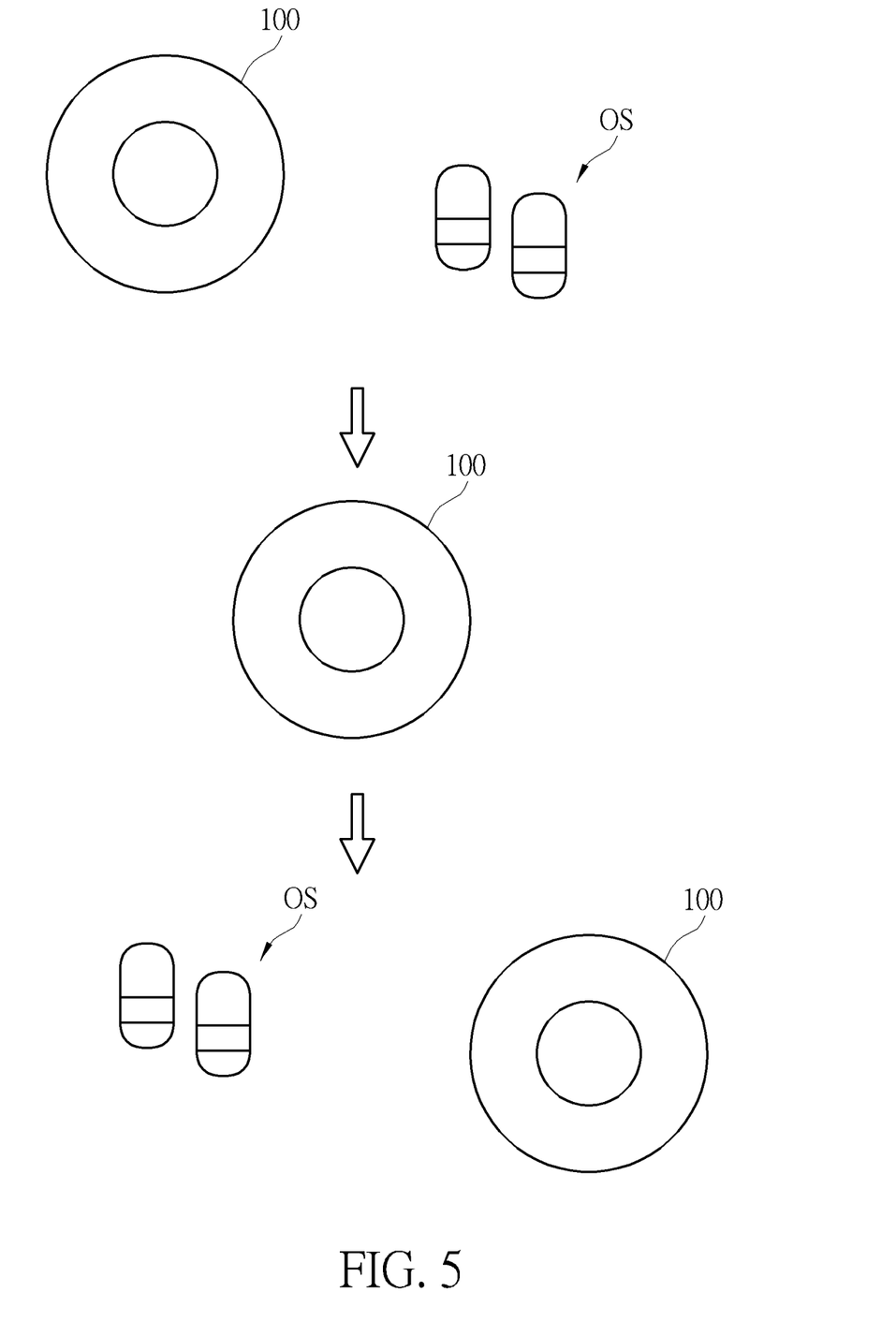
FIG. 5 and FIG. 6 are schematic diagrams illustrating operations of the auto clean machine after the object height is determined, according to embodiments of the present invention.
Figure 6:
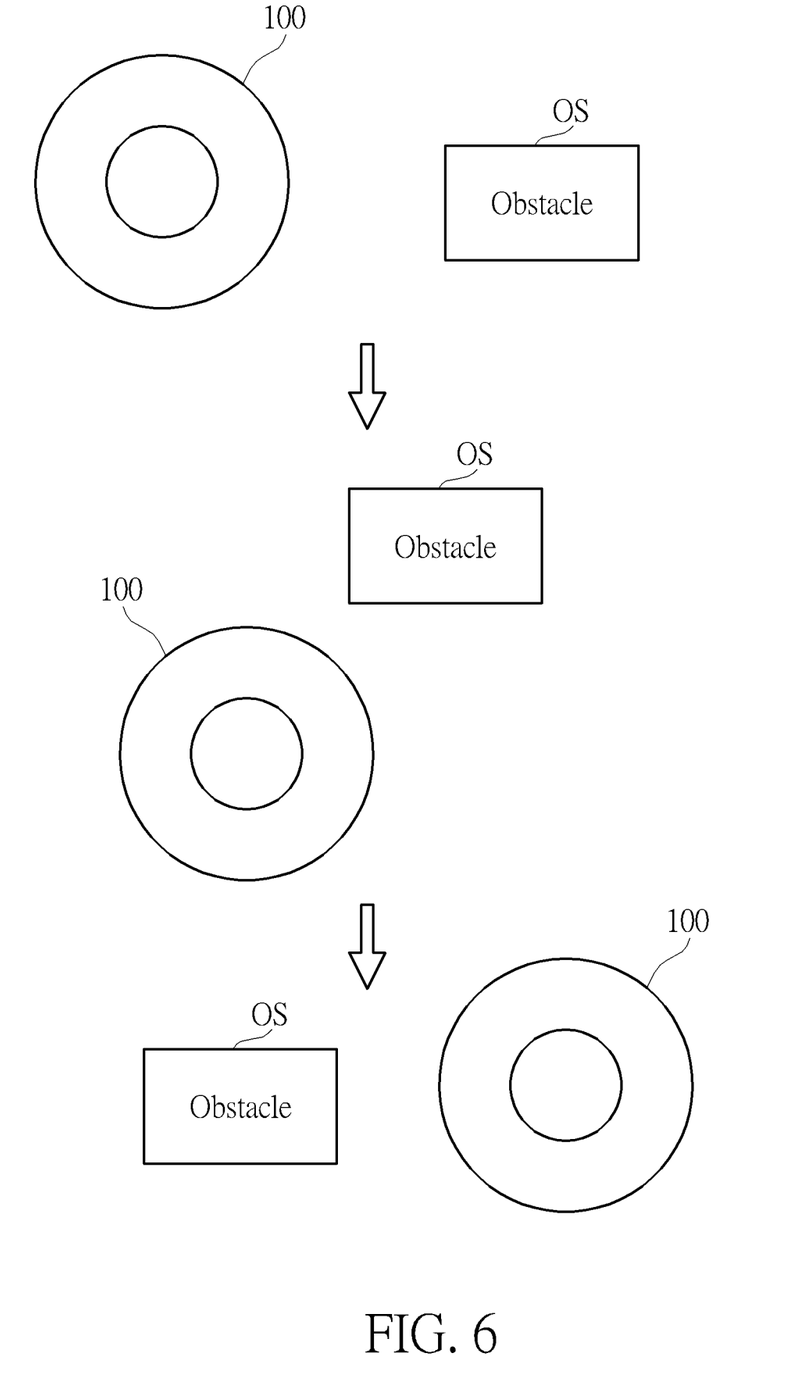

After a height of the obstacle OS is acquired, the auto clean machine 100 may operate based on the height. As illustrated in FIG. 5, the auto clean machine 100 climbs over the obstacle OS if the height is lower than a height threshold. For example, the obstacle OS is a slipper or a wire which has a lower height. Further, as illustrated in FIG. 6, the auto clean machine 100 passes by the obstacle if the height is higher than the height threshold. For example, the obstacle OS is an appliance or a toy which have a higher height. However, the auto clean machine 100 is not limited to operate based on a height of the obstacle OS following these methods.

Figure 7:
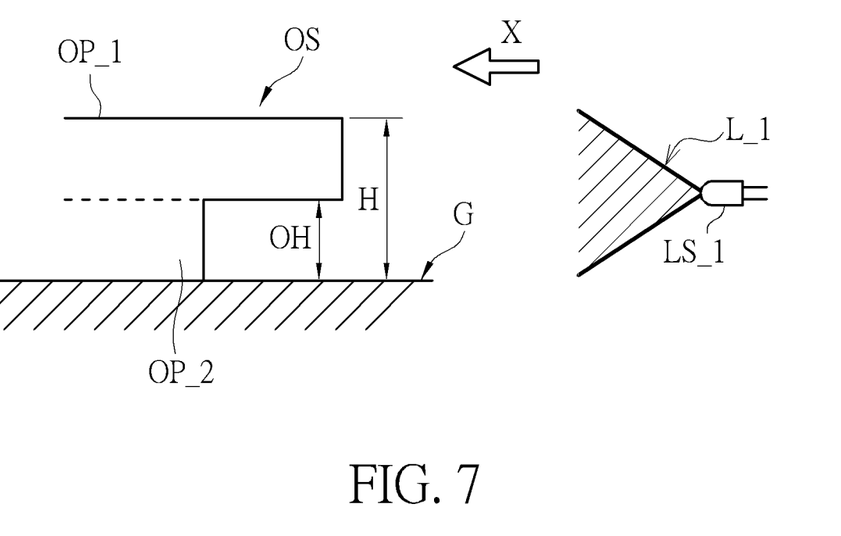
FIG. 7 is a schematic diagram illustrating operations of the embodiment illustrated in FIG. 2 according to another embodiment of the present invention.

The above mentioned embodiments can further applied to compute an overhang height OH of the obstacle OS besides the height H, as shown in FIG. 7. More specifically, the obstacle OS in FIG. 7 has a first part OP_1 and a second part OP_2. The first part OP_1 is on the second part OP_2 and protrudes from the second part OP_2 when the obstacle OS is on the ground. The height H of the obstacle OS means a summing of heights of the first part OP_1 and the second part OP_2. Also, the overhang height OH of the obstacle OS means the height of the second part OP_2.

Figure 8:
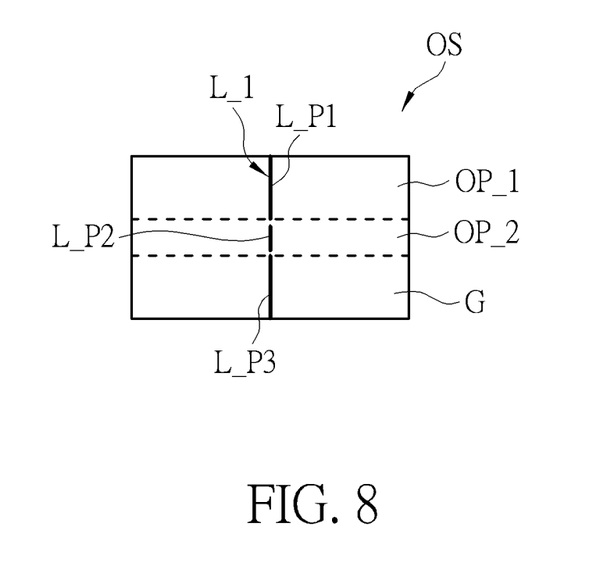
FIG. 8 is a schematic diagram illustrating an example of computing the overhang height.

Many methods can be applied to compute the overhang height OH. FIG. 8 is a schematic diagram illustrating an example of computing the overhang height OH, which is viewed in the X direction in FIG. 7. As shown in FIG. 8, the first light L_1 form the first light source LS_1 respectively generates a first light part L_P1, a second light part L_P2 and a third light part L_P3 on the first part OP_1, the second part OP_2 and the ground G. The overhang height OH can be computed according to the relation between at least one of the first light part L_P1, the second light part L_P2 and the third light part L_P3. Also, in one embodiment, the second light part L_P2 may not be generated if the second part OP_2 is far from the first light source LS_1. In such case, the overhang height OH can be computed according to the relation between the first light part L_P1 and the third light part L_P3.

In the embodiment of FIG. 7 and FIG. 8, only one of the first light source LS_1, which is a vertical line light source, is used to compute the overhang height OH. However, more than two line light sources can be applied to compute the overhang height OH as well. Further, after the overhang height OH is computed, the auto clean machine can operate according to the overhang height. For example, if the overhang height OH is too small, the auto clean machine will not enter the space between the first part OP_1 and the ground G. On the opposite, if the overhang height OH is large enough, the auto clean machine may enter the space between the first part OP_1 and the ground G.

Figure 9:
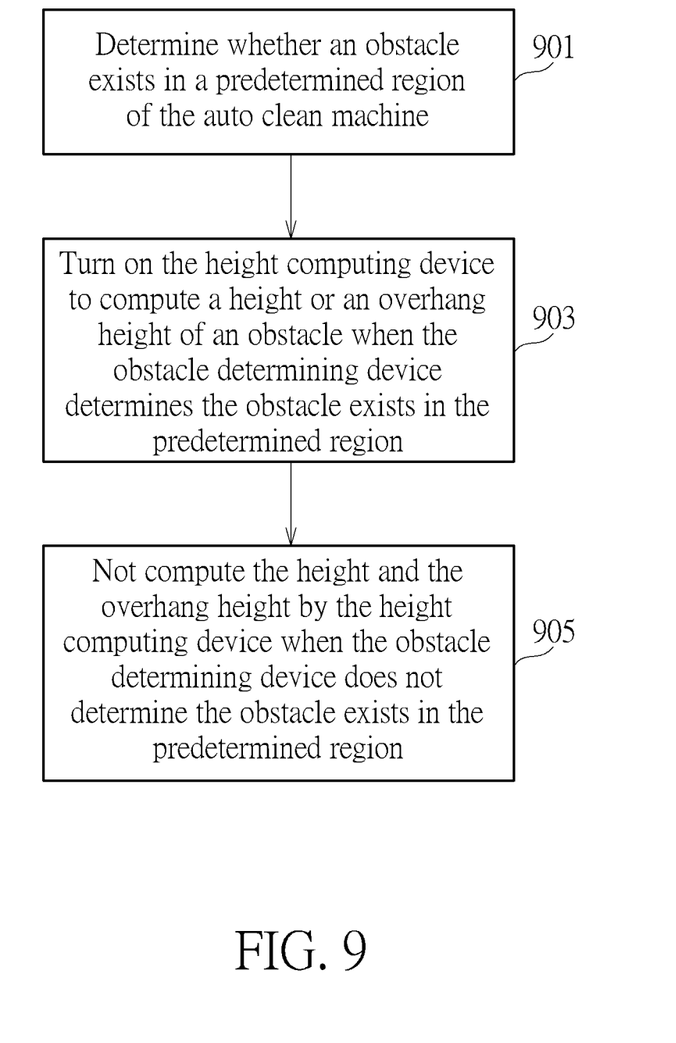
FIG. 9 is a flow chart illustrating an auto clean machine control method, according to one embodiment of the present invention.

In view of above-mentioned embodiments, an auto clean machine control method can be acquired, which comprises following steps as shown in FIG. 9:

Step 901
Determine whether an obstacle exists in a predetermined region of the auto clean machine or not.

Step 903
Turn on the height computing device to compute a height or an overhang height of an obstacle when the obstacle determining device determines the obstacle exists in the predetermined region;

Step 905
Not compute the height and the overhang height by the height computing device when the obstacle determining device does not determine the obstacle exists in the predetermined region.

Other detail steps can be acquired in view of above-mentioned arguments, thus are omitted for brevity here.

In view of above-mentioned embodiments, the auto clean machine can compute a height or an overhang height of an obstacle and operates accordingly, thus the convenience and the accuracy of cleaning performed by the auto clean machine can be increased.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A robot cleaner, comprising:
a first light source, configured to emit first light;
an optical sensor, configured to sense first optical data generated according to the first light;
a processing circuit, configured to compute a height or an overhang height of an obstacle based on the first optical data,
wherein the first light source is turned on when the processing circuit determines the obstacle exists in a predetermined region,
wherein the first light source is turned off when the processing circuit does not determine the obstacle exists in the predetermined region; and
a second light source, configured to emit second light,
wherein the optical sensor senses second optical data generated according to the second light,
wherein the processing circuit determines whether the obstacle exists in the predetermined region or not based on the second optical data,
wherein the processing circuit computes the height of the obstacle when the obstacle existing in the predetermined region of the robot cleaner is determined,
wherein the processing circuit does not compute the height and the overhang height when the obstacle does not exist in the predetermined region is determined.

2. The robot cleaner of claim 1, wherein the first light is line light perpendicular with a ground which the robot cleaner moves on, and the second light is line light parallel with the ground.

3. The robot cleaner of claim 1, wherein the first light source emits the first light to a forward direction of the robot cleaner, and the second light source emits the second light following the forward direction.

4. The robot cleaner of claim 1, wherein the predetermined region is in front of the robot cleaner.

5. The robot cleaner of claim 1, wherein the robot cleaner further operates based on the height or the overhang height after the height or the overhang height is acquired.

6. A robot cleaner control method, applied to a robot cleaner comprising a first light source and a second light source, comprising:
emitting first light by the first light source;
sensing first optical data generated according to the first light;
computing a height or an overhang height of an obstacle based on the first optical data, wherein the first light source is turned on when the processing circuit determines the obstacle exists in a predetermined region, wherein the first light source is turned off when the processing circuit does not determine the obstacle exists in the predetermined region;

wherein the robot cleaner control method further comprises:

emitting second light by the second light source;

sensing second optical data generated according to the second light;

determining whether the obstacle exists in the predetermined region or not based on the second optical data;

computing the height of the obstacle when the obstacle existing in the predetermined region of the robot cleaner is determined; and not computing the height and the overhang height when the obstacle does not exist in the predetermined region is determined.

7. The robot cleaner control method of claim 6, wherein the first light is line light perpendicular with a ground which the robot cleaner moves on, and the second light is line light parallel with the ground.

8. The robot cleaner control method of claim 6, wherein the first light source emits the first light to a forward direction of the robot cleaner, and the second light source emits the second light following the forward direction.

9. The robot cleaner control method of claim 6, wherein the predetermined region is in front of the robot cleaner.

10. The robot cleaner control method of claim 6, further comprising:

controlling the robot cleaner to operate based on the height or the overhang height after the height or the overhang height is acquired.

* * * * *